United States Patent [19]
Roland

[11] 3,813,124
[45] May 28, 1974

[54] SAFETY PROP FOR DUMP TRUCK BODIES
[75] Inventor: David H. Roland, Charlotte, N.C.
[73] Assignee: J. A. Jones Construction Company, Charlotte, N.C.
[22] Filed: Dec. 27, 1972
[21] Appl. No.: 319,010

[52] U.S. Cl............................................ 298/17 B
[51] Int. Cl............................................. B60p 1/04
[58] Field of Search................... 298/17 B; 280/475

[56] References Cited
UNITED STATES PATENTS

| | | | |
|---|---|---|---|
| 1,617,714 | 2/1927 | Jones | 280/475 X |
| 2,750,055 | 6/1956 | Huffines | 298/17 B |
| 3,183,037 | 5/1965 | Reichert | 298/17 B |
| 3,272,558 | 9/1966 | Rathman | 298/17 B |

FOREIGN PATENTS OR APPLICATIONS
640,727   5/1962   Canada.................... 298/17 B

*Primary Examiner*—Richard J. Johnson
*Attorney, Agent, or Firm*—Clarence A. O'Brien & Harvey B. Jacobson

[57] ABSTRACT

A safety promotion prop for use on a tiltably hinged dump truck body and adapted for use while equipment maintenance and servicing work is being taken care of by a mechanic or workman. It comprises a channel-shaped mounting fixture or bracket which is operatively bolted or otherwise mounted in a prescribed functioning position, that is, on the surface of a member of the underframe of a dump body. The open-bottom of the channel portion of this fixture (or bracket) embodies spaced flanges joined by a web portion. An elongated strut (leg or equivalent support) provides a prop and has an upper end pivotally bolted between the flanges. The other or lower end is free and the median portion carries a suitable chain which is adapted to be hitched to a fixed storing hook. A strut erecting, positioning and seating bracket is fixedly mounted on a prescribed surface of the usual sub-frame of the truck's chassis frame. This bracket has a depending mounting cleat whose upper end is provided with a laterally projecting U-shaped member, herein described as a stirrup, and which serves to receive and retentively seat the coacting end of the strut when serving as a prop.

7 Claims, 7 Drawing Figures

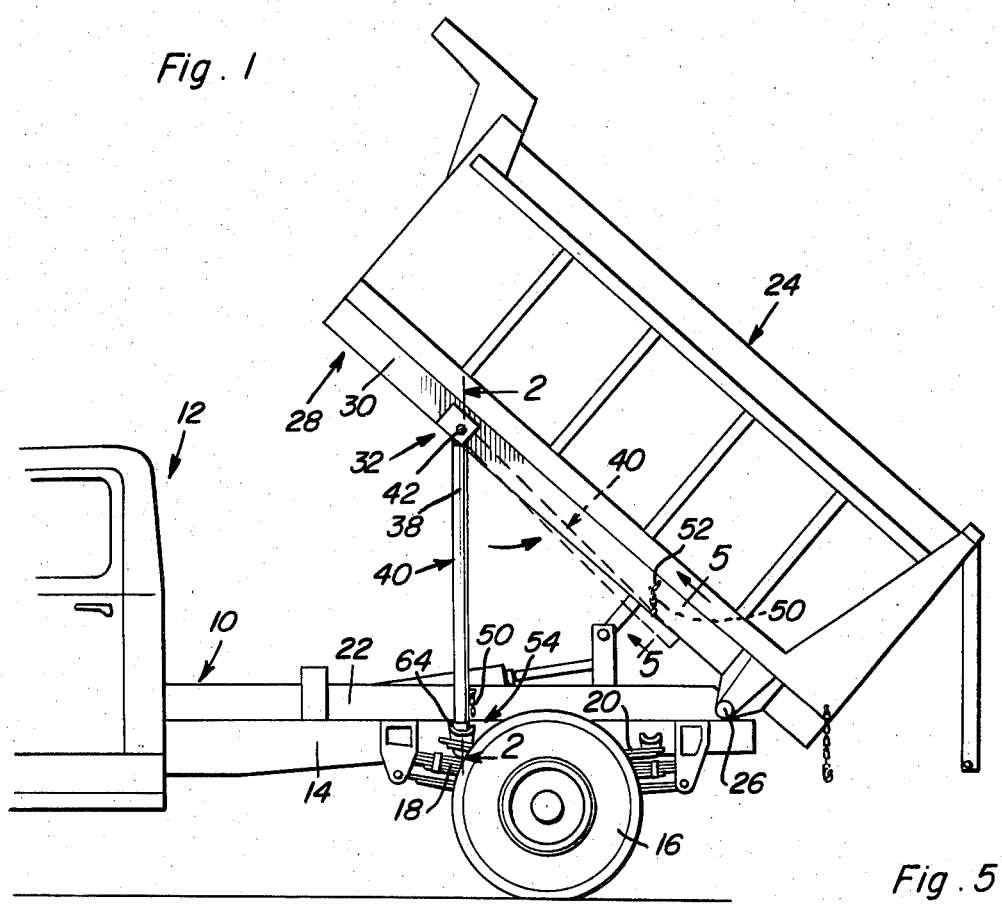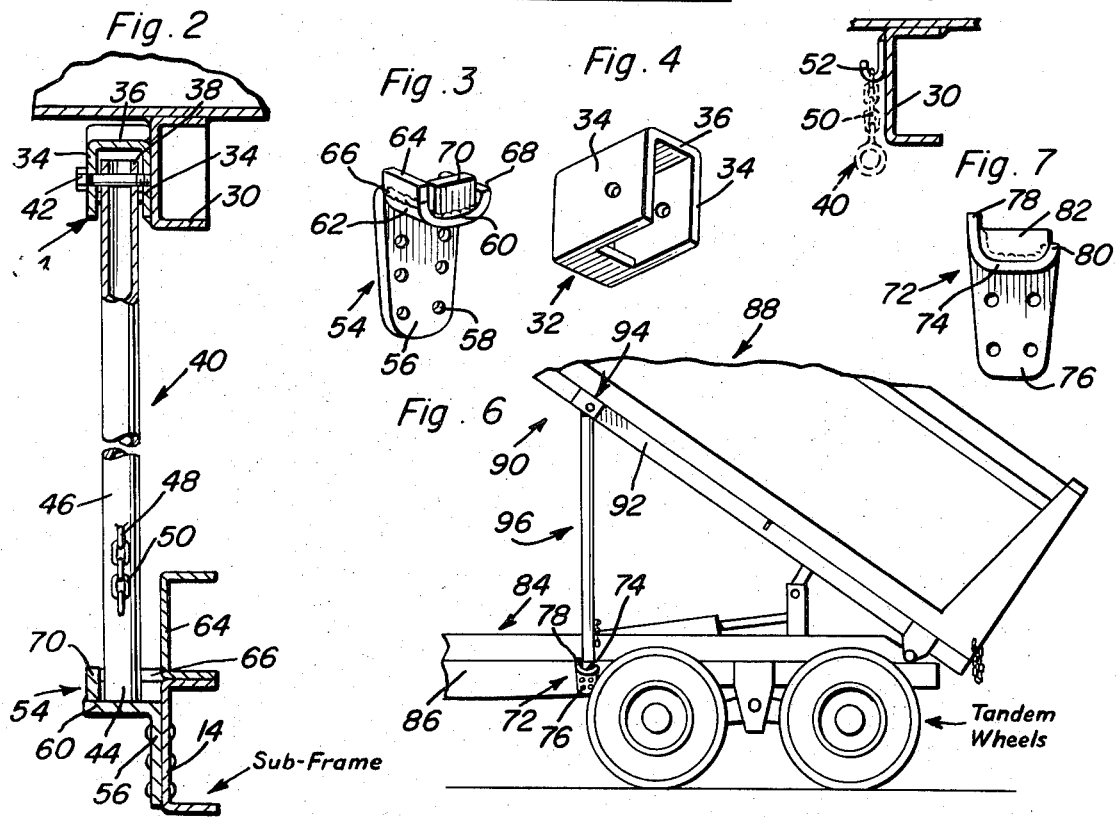

SAFETY PROP FOR DUMP TRUCK BODIES

This invention relates to safety props such as are being used, in one manner or another, to temporarily elevate and retain a hinged dump body in supported position while maintenance and servicing requirements are being attended to by a mechanic or trained workman, and has to do, more particularly, with a simplified but highly reliable adaptation which, as experience has shown, well and satifactorily serves the purposes for which it has been devised and successfully used.

The herein disclosed invention is intended to better comply with motor vehicle safety and health regulations wherein, briefly stated, trucks with liftable and lowerable dump bodies must be provided with reliably positive support means which means has to be permanently mounted and which is such in adaptability that it is capable of being securely locked in a position and manner to cope with and prevent lowering of the dump body during the time maintenance work and inspection activities are being taken care of.

The invention herein revealed provides an inexpensive but reliable prop structure which minimizes the likelihood of a truck body falling or lowering and injuring the mechanic or other person engaged in repairing or servicing the equipment.

For background purposes attention is directed to a similarly constructed and performing safety supporting device for dump truck bodies disclosed in U.S. Pat. No. 3,183,037 granted to Robert B. Reichert. The disclosed invention as will be hereinafter more clearly appreciated, is characterized by many and significant features and advantages. Another safety device for dump trucks which is indicative of the art to which the invention relates is shown in a U.S. Pat. No. to A. D. Hutchinson, 2,407,021, which may also be evaluated as having a bearing on the disclosed invention. For further background information attention may be accorded the safety prop shown in U.S. Pat. No. 3,157,435 granted to Vern H. Sherven.

By comparison with prior art safety props the present invention relates to an advance in the art in that the strut or prop can be readily unhooked and moved from a stored position, placed in use and restored without risk of injury for the reason that no part of the body of the mechanic or other person performing the maintenance requirements need be placed within the area of danger, that is, between the wheel supported truck frame or chassis and the liftable and lowerable dump body.

Briefly the inventive concept lends itself for manually controllable use while equipment maintenance and servicing work is being attended to by a mechanic or other person and which is characterized, broadly stated, by safety support means which is designed and adapted to be installed between the usual underframe of a hingedly mounted dump body and the sub-frame of the wheel supported truck chassis frame. To the ends desired it is characterized by an elongated rigid strut which when in use, functions as a safety prop. Adapter means for the strut is designed and adapted to be mounted on an accessible surface of a member or component part of the aforementioned underframe. This strut has an upper or forward end pivotally mounted on the adapter means. The rearward or lower end of the strut is manually raisable and lowerable and storing means is provided for detachably connecting said lower end to a component part of the underframe when the strut is stored and not being used. A structurally and functionally novel strut erecting, positioning and retaining means is fixedly mounted on an accessible surface of the subframe of the chassis frame. The lower end is retentively seatable on the erecting and retaining means.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a view in side elevation showing a fragmentary portion of a dump truck construction, illustrating the dump body in an elevated position and showing the strut, that is, the elevating and sustaining prop and how it is positioned for use and how it serves to prevent the dump body from accidentally falling or lowering itself in an unsafe manner.

FIG. 2 is a view with parts in section and elevation and on a suitably enlarged scale taken approximately on the plane of the vertical section line 2—2 of FIG. 1, looking in the direction of the indicating arrows.

FIG. 3 is a view in perspective of the specially constructed bracket which functions to seat and retain the upstanding prop.

FIG. 4 is a view in perspective of the adapter fixture or bracket for the upper end of the strut.

FIG. 5 is an enlarged detail view taken approximately on the plane of the section line 5—5 of FIG. 1 and which serves to detail the chain storing hook.

FIG. 6 is a view in side elevation on a smaller scale and which shows the same general arrangement as depicted in FIG. 1 but with a tandem axle truck and with the seating bracket mounted in a slightly different manner.

FIG. 7 is a view in elevation of the seating bracket shown in use in FIG. 6.

Motor trucks of conventional design are characterized by a main chassis frame embodying two opposing steel channels with cross-bracing at 90° to channels and in number and at locations required. The front bumper, radiator, engine and operator's cab are attached to the main frame. Those trucks which transport load weights warranting it are equipped with overload springs, semielliptical assemblies mounted at the rear axle and above the truck frame-supporting springs, which are attached to the truck axle. The truck frame-supporting spring is attached to the truck frame at extremities of the spring by means of shackles welded or riveted, forward and rearward of the rear axle, as convenient for proper weight distribution, and attached to the rear axle, usually by means of "U" bolts. The overload (auxiliary) spring comes into use when the weight, resulting from load, causes the truck frame-supporting spring to be depressed in a generally well known manner.

With reference in particular to FIGS. 1 to 5 inclusive, the wheel-supported chassis in FIG. 1 is denoted by the numeral 10, the cab being denoted at 12, the main frame at 14, a ground-engaging wheel at 16, spring suspension means therefor at 18 and an overload leaf spring unit at 20. The frame atop the chassis is denoted at 22. The dump body, of suitable construction, is denoted at 24 and is hingedly mounted at 26, the underframe being designated at 28. That member of the underframe which comes into use here comprises a channel or an equivalent iron or frame member 30 as better shown in FIG. 2. It is on this frame member 30 that the aforementioned channel-shaped fixture (or bracket) 32 is mounted. This bracket comprises a channel portion characterized by flanges 34 joined by a web at 36. This bracket may be welded or otherwise secured at a predetermined point on the frame member 30 in a manner to accommodate the upper end portion 38 of the pivoted strut or prop 40. The upper end 38 of the prop is nested in the channel and is assembled and operatively mounted by way of a headed bolt 42 as detailed in FIG. 2. The lower free swingable end portion of the strut or prop is denoted at 44. The aforementioned median portion is denoted at 46 and is provided with a lug or the like 48 carrying a prop storing chain 50. The free end links of the chain can be connected with the bill of a suitable storing hook 52 which is mounted on the aforementioned frame member 30 at the point appearing at the right in FIG. 1. Manifestly, when the prop is not in use it is folded up to an out-of-the-way position as shown in phantom lines in FIG. 1 at which time it is held in this stored position by way of the chain and hook means.

The bracket which functions to seat and retain the lower end portion 44 in its set and operating position is denoted with particularity in FIG. 3 and is designated at 54. This particular bracket is of a type which is employed on trucks and may be regarded as a factory-installed bracket which is cooperable with end portions of the aforementioned overload spring 20 and which functions as a limit stop with end portions of the spring under certain overload situations as heretofore set forth. The bracket 54 comprises a depending cleat 56 having bolt holes 58 by way of which it is mounted in place. The upper end portion of the cleat is provided with a lateral outstanding substantially U-shaped rest 60 which normally serves as an abutment in the manner suggested in FIG. 1. In the instant situation one end portion 62 is provided with an added upstanding extension 64 which is welded in place as at 66. It will be seen that the upper end of this addition extends above the level of the upper end 68 and that, in addition, an insert 70 is provided and is welded in place and bridges the concave portion in a manner to provide what is herein designated as a seating and retaining stirrup for the lower end 44 of the manually liftable and lowerable strut or prop 40.

To place the invention in use the chain 50 is disengaged from the hook means 52 and the prop or strut is lowered to a resting position atop the stirrup-like bracket 54. The truck body is elevated to a height allowing the strut to fall into the seating means provided therefor in the bracket, that is the stirrup portion thereof causing an audible click. Experience and practice has shown that this audible click functions as a signal.

In actual practice and instead of having to rely upon the audible click above mentioned it would be within the purview of the invention to provide an electrical powered audible or visual signal, this being an optional aspect of the overall concept.

To restore the strut or prop to its stored position, the truck bed is given slight additional elevation, this in a manner to allow the lower end to clear the rear or lower lip 68 of the bracket 54. Hydraulic pressure functions to hold the truck body at that elevation while the strut is returned to stored position and a link of the chain is attached to the hook, after which the truck body can be lowered to horizontal position.

The modified bracket shown in FIG. 7 is denoted by the numeral 72 and is prefabricated and readied for installation as shown in FIG. 7. Here the U-shaped stirrup is denoted by the numeral 74, the depending mounting lug or cleat is denoted at 76. The elevated or extended lip or upper edge portion of the stirrup is denoted at 78 and the lower lip is denoted at 80. The safety guard or insert, which assists in preventing displacement of the strut and which is welded in place is denoted at 82. This arrangement is used on a tandem wheel truck construction wherein one frame member is denoted at 84, the main frame at 86 and the dump body is denoted at 88. The underframe of the dump body is designated at 90, the frame member is denoted at 92 and serves, as already described, to accommodate the fixedly mounted fixture 94 for the strut or prop 96. It was deemed advisable to illustrate this slight variation to facilitate a more comprehensive understanding of the overall aspect of the invention. In carrying out this phase of the invention in practice it will become necessary that the bracket be fashioned of steel and welded to the main frame of the tandem axle truck construction.

It is believed that a studied consideration of the views of the drawing in conjunction with the detailed description will enable the reader to obtain a clear and comprehensive understanding of the subject matter of the invention, its features and advantages and manner of use. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For manually controllable use while equipment maintenance and servicing work are being attended to by a mechanic, safety support means for installation between the usual underframe of a hingedly mounted dump body and the subframe of a wheel-supported truck chassis frame comprising, an elongated rigid strut constituting a temporarily applicable safety prop, adapter means for said strut adapted to be mounted on an accessible retaining surface of a member of said underframe, said strut having an upper end pivotally mounted on said adapter means, the lower end of said strut being manually raisable and lowerable and having storing means for detachably connecting said lower end to a component of said underframe when said strut is stored and not being used, and strut erecting, positioning and retaining means fixedly mounted on an accessible surface of the subframe of said chassis frame, said lower end being retentively seatable on said erecting and retaining means, said strut erecting, positioning and retaining means comprising a bracket adapted to be fixedly mounted on said subframe, said bracket embodying a substantially U-shaped strut seating stirrup provided with an integral depending cleat adapted to be superimposed upon and fastened to a frame member of said subframe.

2. The safety support means defined in and according to claim 1, and wherein said stirrup has a forward upper end portion rising to a level above the level of the coordinating rearward upper end, whereby to provide a strut limit stop and which when forcibly struck by the down and forwardly swinging lower end of the strut produces an audible signalling sound.

3. The safety support means defined in and according to claim 2, and wherein the concaved seat portion of said stirrup is bridged by a fixed insert which serves as a guard and assists in piloting and maintaining the strut in its given propping position.

4. The safety support means defined in and according to claim 1, and wherein said adapter means comprises a channel-shaped fixture embodying spaced parallel flanges between which the upper end of said strut is fitted, and said strut comprising a hollow leg whose upper end is confined in the channel portion between said flanges and is pivotally joined thereto by an assembling and pivoting bolt secured to the respective flanges and bridging said channel portion.

5. The safety support means defined in and according to claim 4, and wherein the means for storing said strut comprises a chain carried by a median portion of said strut and having free links which are capable of being detachably connected to a coacting chain holding hook fixed on a predetermined surface of said underframe.

6. A safety prop for a tiltably hinged dump truck body comprising an open bottomed channel-shaped fixture designed and adapted to be operatively bolted in a predetermined serviceable position on the surface of the underframe of a dump body, the open-bottom channel portion of said fixture embodying spaced parallel flanges joined by a web, an elongated rigid strut providing a prop and having one end nested in the channel portion and pivotally bolted between said flanges, the other end of said strut being free and the intermediate portion having an attached chain adapted to be detachably hitched to a fixed strut storing hook, and a strut erecting, positioning and retaining bracket designed and adapted to be fixedly mounted on a predetermined surface of the subframe of a truck chassis, said bracket embodying a mounting cleat having an upper end provided with a U-shaped stirrup capable of receiving and retentively seating the free end of said strut.

7. The safety support means defined in and according to claim 6, and wherein said stirrup has a forward upper end portion rising to a level above the level of the corresponding rearward upper end, whereby to provide a strut limit stop and which when forcibly struck by the down and forwardly swinging lower end of the strut produces an audible signalling sound.

* * * * *